United States Patent
Lin et al.

(10) Patent No.: US 11,734,925 B2
(45) Date of Patent: Aug. 22, 2023

(54) LARGE-SCALE CROP PHENOLOGY EXTRACTION METHOD BASED ON SHAPE MODEL FITTING METHOD

(71) Applicant: ZHEJIANG UNIVERSITY, Zhejiang (CN)

(72) Inventors: Tao Lin, Zhejiang (CN); Zhixian Lin, Zhejiang (CN); Hao Jiang, Zhejiang (CN); Yibin Ying, Zhejiang (CN)

(73) Assignee: ZHEJIANG UNIVERSITY, Zhejiang (CN)

( * ) Notice: Subject to any disclaimer, the term of this patent is extended or adjusted under 35 U.S.C. 154(b) by 0 days.

(21) Appl. No.: 17/778,014

(22) PCT Filed: Oct. 29, 2020

(86) PCT No.: PCT/CN2020/124834
§ 371 (c)(1),
(2) Date: May 19, 2022

(87) PCT Pub. No.: WO2021/098471
PCT Pub. Date: May 27, 2021

(65) Prior Publication Data
US 2022/0406054 A1     Dec. 22, 2022

(30) Foreign Application Priority Data
Nov. 19, 2019   (CN) .......................... 201911134130.3

(51) Int. Cl.
*G06V 20/10*     (2022.01)
*G06T 7/149*     (2017.01)
(Continued)

(52) U.S. Cl.
CPC ............ *G06V 20/188* (2022.01); *G06T 7/149* (2017.01); *G06V 10/60* (2022.01); *G06V 10/764* (2022.01);
(Continued)

(58) Field of Classification Search
CPC .. G06V 10/60; G06V 10/7715; G06V 10/776; G06V 10/764; G06V 20/188;
(Continued)

(56) References Cited

U.S. PATENT DOCUMENTS

2018/0330486 A1   11/2018   Cohen

FOREIGN PATENT DOCUMENTS

| CN | 104850694 | 8/2015 |
| CN | 111104858 | 5/2020 |

OTHER PUBLICATIONS

Zeng, Linglin, et al. "A hybrid approach for detecting corn and soybean phenology with time-series MODIS data." Remote Sensing of Environment 181 (2016): 237-250. (Year: 2016).*

(Continued)

*Primary Examiner* — Vu Le
*Assistant Examiner* — Tracy Mangialaschi
(74) *Attorney, Agent, or Firm* — JCIPRNET

(57) ABSTRACT

Disclosed is a large-scale crop phenology extraction method based on a shape model fitting method. The method comprises: acquiring a multi-year vegetation index time sequence curve in a localized geographic region; performing smooth fitting on the vegetation index time sequence curve by using a dual logistic function fitting means; establishing shape models by using reference curves and reference points of agrometeorological stations; performing shape model fitting by means of transformation; and obtaining a phenological period extraction value of the localized geographic region by means of calculation using the optimal scaling parameter. According to the present invention, macroscopic features of the curve are used, such that the influence of localized fluctuation and noise of the curve can be reduced, (Continued)

and a better extraction precision is obtained; and each phenological period of a crop can be extracted at the same time.

9 Claims, 5 Drawing Sheets

(51) Int. Cl.
  *G06V 10/60* (2022.01)
  *G06V 10/764* (2022.01)
  *G06V 20/13* (2022.01)
  *G06V 10/77* (2022.01)
  *G06V 10/776* (2022.01)

(52) U.S. Cl.
  CPC ........ *G06V 10/776* (2022.01); *G06V 10/7715* (2022.01); *G06V 20/13* (2022.01); *G06T 2207/20124* (2013.01); *G06T 2207/30188* (2013.01)

(58) Field of Classification Search
  CPC .................. G06V 20/13; G06T 7/149; G06T 2207/30188; G06T 2207/20124; G06T 7/0004; G06T 2207/10032
  See application file for complete search history.

(56) References Cited

OTHER PUBLICATIONS

Zeng, Linglin, and Daxiang Xiang. "A Study on Phenology Detection of Corn in Northeastern China with Fused Remote Sensing Data." Recent Advances and Applications in Remote Sensing. IntechOpen, 2018. (Year: 2018).*

Diao C. Innovative pheno-network model in estimating crop phenological stages with satellite time series. ISPRS journal of photogrammetry and remote sensing. Jul. 1, 2019;153:96-109. (Year: 2019).*

Xiao Ding. "Study on Distribution of Crop's Structure in Heilongjiang", Agriculture, China Master's Theses Full-text Database, with English abstract, Jan. 15, 2015, pp. 1-65.

Zongchen Hu. "Mapping Major Crops Spatial and Temporal Distribution in China Using MODIS Time Series Data", Information & Technology, China Master's Theses Full-text Database, with English abstract, Jan. 15, 2014, pp. 1-83.

"International Search Report (Form PCT/ISA/210) of PCT/CN2020/124834," dated Feb. 5, 2021, with English translation thereof, pp. 1-5.

* cited by examiner

LARGE-SCALE CROP PHENOLOGY EXTRACTION METHOD BASED ON SHAPE MODEL FITTING METHOD

CROSS-REFERENCE TO RELATED APPLICATION

This application is a 371 of international application of PCT application Ser. No. PCT/CN2020/124834, filed on Oct. 29, 2020, which claims the priority benefits of China application no. 201911134130.3, filed on Nov. 19, 2019. The entirety of each of the above mentioned patent applications is hereby incorporated by reference herein and made a part of this specification.

BACKGROUND

Technical Field

The invention relates to the field of agricultural remote sensing, in particular, relates to a large-scale crop phenology extraction method based on a shape model fitting method.

Description of Related Art

Agricultural production is the cornerstone of human society, and extensive and reliable agricultural information is an important basis for ensuring regional and global food security. The phenology of crops is reflected in the seasonal changes in their physiological characteristics and their physiological responses to environmental conditions along with growth, and these changes may reflect the impact of climate change on the agri-ecosystem. The phenological information of crops may provide important decision-making information for crop irrigation scheduling and fertilization management. Precise phenology is also an important input for accurate crop yield prediction models. In addition, phenological period is also an important basis for remote sensing crop identification.

At present, the methods of phenology monitoring mainly include the field observation method, accumulated temperature modeling method and remote sensing monitoring. The field observation method is relatively simple and easy to implement, and the results are relatively accurate, but due to the influence of subjective factors, it is difficult to guarantee the quality of the obtained data. Further, implementation of this method requires a lot of human and material resources, the observation period is long, and the area is small, so it is difficult for this method to be applied to a large scale. The accumulated temperature modeling method requires much input information, including crop sowing date, temperature, and accumulated temperature information corresponding to different phenological periods, which limits its application range. Remote sensing technology does not have the above shortcomings, and it further exhibits advantages, such as large monitoring area, high timeliness, objectivity, accuracy, etc.

In recent years, domestic and foreign scholars have carried out extensive research on remote sensing phenology extraction, mainly including the following methods. First, the threshold method, which is to estimate the phenological period by using a fixed threshold or a dynamic threshold. Second, the moving window method, that is, the phenological period is determined by detecting the change of the time sequence vegetation index curve in the defined moving time window. Third, the function fitting method, that is, mathematical functions such as logistic functions are used to fit the time sequence vegetation index curve of a crop whose phenology is to be extracted, and the phenological period is determined according to the feature points existing on the fitting curve. However, these methods mainly focus on the localized morphological feature points or feature segments of the vegetation index time sequence curve. On the one hand, it is easily influenced by localized fluctuations such as noise on the time sequence curve, which brings errors to the phenology extraction results. On the other hand, different phenological periods and different crops need to apply different measurement standards, so the method is less versatile, and it is difficult of the method to be applied to a large scale.

SUMMARY

In order to solve the problems in the related art, the invention provides a large-scale crop phenology extraction method based on a shape model fitting method in which a vegetation index time sequence curve is established by using satellite remote sensing data, curve fitting is performed by using the shape model fitting method, ground observation data is combined, and a phenology extraction value is calculated according to optimal fitting scaling, and in this way, the limitations of the currently-available remote sensing crop phenology extraction applications such as small scale, low accuracy, poor versatility, etc. are solved.

The technical solution adopted by the invention includes the following steps.

In step S1, a vegetation index time sequence curve is obtained. All pixels where a crop whose phenology is to be extracted is located in a localized geographic region are selected according to crop surface classification data, a vegetation index of each of the pixels is calculated based on satellite remote sensing image data to obtain the vegetation index time sequence curve of each pixel, and a multi-year vegetation index time sequence curve of pixels where an agrometeorological station is located is obtained according to geographic coordinate data of the agrometeorological station.

The crop surface classification data is the existing data, and through crop identification performed on the satellite remote sensing data, the spatial distribution information of different crops may be obtained. The pixels are pixels in the satellite remote sensing image.

In step S2, smooth fitting is performed on the vegetation index time sequence curve. The vegetation index time sequence curve of each pixel where the crop whose phenology is to be extracted is located and each pixel where the agrometeorological station is located are smoothly fitted by using a double logistic function fitting means, and a smooth vegetation index time sequence curve is obtained.

In step S3, a shape model is established. A shape model reference point is established by using a ground phenological observation value recorded by the agrometeorological station, a corresponding shape model reference curve is established by using the vegetation index time sequence curve of each pixel where the agrometeorological station is located, the shape model is formed by using the shape model reference point and the shape model reference curve, one shape model is established for each agrometeorological station, and a plurality of shape models are established for a plurality of station sites.

The ground phenological observation value refers to the phenological period of a ground crop, such as the phenological period of wheat.

In step S4, shape model fitting is performed. A most suitable shape model of the agrometeorological station corresponding to each pixel where the crop whose phenology is to be extracted is located is selected according to a spatial relationship (spatial relationship refers to distance and geographical environment similarity or dissimilarity) between each pixel and the agrometeorological station in the localized geographic region, the shape model reference curve is fitted to the smooth vegetation index time sequence curve of the pixel, a root mean square error (RMSE) between the two curves is calculated after fitting is calculated, a scaling parameter corresponding to a minimum root mean square error is treated as an optimal scaling parameter of the pixel, and the scaling parameter exhibits an optimal fitting effect.

In step S5, a phenological period is extracted from the region. The shape model reference point is transformed according to the optimal scaling parameter to obtain a phenology extraction result of each pixel where the crop whose phenology is to be extracted is located.

The vegetation index adopted by the invention is the wide dynamic range vegetation index (WDRVI). The wide dynamic range vegetation index is added with a weighting coefficient on the basis of NDVI, which may improve the sensitivity of NDVI in a region with high vegetation coverage. The formula for calculating the wide dynamic range vegetation index (WDRVI) is as follows:

$$WDRVI = \frac{\alpha \cdot \rho_{NIR} - \rho_{RED}}{\alpha \cdot \rho_{NIR} + \rho_{RED}}$$

in the formula, $\rho_{NIR}$ is reflectance in a near-infrared band, $\rho_{RED}$ is reflectance in a red band, and $\alpha$ is a weighting coefficient, whose value varies according to different crops, generally is 0.1 to 0.2.

The double logistic function fitting means in step S2 specifically includes the following step: the vegetation index time sequence curve of an entire growth period of the crop is fitted to a double logistic function curve. The double logistic function includes six parameters, $VI_l$, $VI_m$, S, A, S', and A', and a fitted formula is expressed as follows:

$$VI(t) = VI_1 + (VI_m - VI_1) \times \left( \frac{1}{1 + \exp(-S' \times (t - S))} + \frac{1}{1 + \exp(A' \times (t - A))} - 1 \right)$$

where $VI_l$ represents a mean vegetation index in a crop non-growing period (i.e., a first half) in the vegetation index time sequence curve, $VI_m$ represents a peak value of the vegetation index time sequence curve, t represents time, S and A respectively represent time corresponding to a rising inflection point and a falling inflection point in the vegetation index time sequence curve, S' and A' respectively represent curvatures at the rising inflection point and the falling inflection point, and VI(t) represents the vegetation index at time t.

The rising inflection point refers to the inflection point with the largest slope, and the falling inflection point refers to the inflection point with the largest slope.

In the step S3, the shape model corresponds with the agrometeorological station one-to-one, representing the typical seasonal vegetation index response of the crop within a specific spatial range of the corresponding agrometeorological station. The shape model reference point uses a mean value of multi-year ground observation phenological periods of the agrometeorological station, and the shape model reference curve uses a mean value of multi-year historical vegetation index time sequence curves of each pixel where the agrometeorological station is located.

In step S4, the selection of the most suitable shape model for each pixel where the crop whose phenology is to be extracted is located according to the spatial relationship between the pixel and the agrometeorological station is comprehensively made based on a spatial distance and a geographical environment factor and is processed and obtained by weighted calculation. The similarity may be weighted and calculated in specific implementation, and the one with the highest similarity is treated as the most suitable one.

In the shape model fitting method performed in step S4, the following formula is used to fit and transform the shape model reference curve to the smooth vegetation index time sequence curve of the crop whose phenology is to be extracted, and the specific formula is as follows:

$$g(x) = yscale \times h(xscale \times (x_0 + tshift))$$

where g(x) represents the shape model reference curve after fitting and transformation, h(x) represents the shape model reference curve, xscale and yscale respectively represent scaling parameters in x-axis and y-axis directions, tshift represents an offset in the x-axis direction, and $x_0$ represents the shape model reference point.

The following formula is then used to process and obtain the root mean square error (RMSE) between the two curves of the shape model reference curve after fitting and transformation and the smooth vegetation index time sequence curve of the crop whose phenology is to be extracted:

$$RMSE = \sqrt{\frac{1}{365/n} \sum_{t=n,2n,\ldots 365} (f(x) - g(x))^2}$$

where x represents a daily date, n represents a time interval of the curve, and f(x) represents the smooth vegetation index time sequence curve of the crop whose phenology is to be extracted.

The optimal scaling parameter is determined according to a minimum value of the root mean square error, and the fitting effect is optimal at this time.

In step S5, the following formula is used to transform each shape model reference point according to the optimal scaling parameter to obtain a phenological period to be extracted of each pixel where the crop whose phenology is to be extracted is located, and the extracted values of the phenological periods of all pixels in the localized geographic region are integrated to obtain a phenological distribution in time and space of the region:

$$X_{est} = xscale \times (x_0 + tshift)$$

where $x_0$ represents a phenological period of each shape model reference point, and $X_{est}$ is an extracted and obtained phenological period of the crop whose phenology is to be extracted.

A size of the localized geographic region is not limited and at least includes one pixel.

The phenological period to be extracted includes each phenological period of the entire growth period of the crop, taking corn crops as an example, the phenological period includes but not limited to the emergence period, the three-leaf period, the greening period, the heading period, the maturity period, and the like.

The pixel is the smallest pixel unit in the satellite remote sensing image data. According to different satellite remote sensing products, the pixel size may be 30 m×30 m, 250 m×250 m, 500 m×500 m, etc.

The method provided by the invention solves the limitation of the existing methods for crop extraction phenology. The shape model is used to represent the typical growth curve of the crop, and then the shape model and the crop growth curve are fitted by transformation. Finally, the phenological period to be extracted is calculated by using the obtained optimal scaling parameter. In the method, macroscopic features of the vegetation index time sequence curve are used, such that the influence of localized fluctuation and noise of the curve can be reduced, and a better phenological extraction precision is obtained. In addition, in the method, each phenological period of a crop can be extracted at the same time, and there is no need to respectively set different measurement standards, such that the method can be applied to large-scale crop phenology extraction.

Effects provided by the invention includes the following.

According to the method of the present invention, macroscopic features of the curve are used, such that the influence of localized fluctuation and noise of the curve can be reduced, and a better extraction precision is obtained; and each phenological period of a crop can be extracted at the same time, and there is no need to respectively set different measurement standards, such that the method can be applied to large-scale crop phenology extraction.

DESCRIPTION OF THE EMBODIMENTS

The principles and features of the invention are described below together with the accompanying drawings, and the examples are only used to explain the invention and is not used to limit the scope of the invention. Based on the embodiments of the invention, all other embodiments obtained by a person having ordinary skill in the art without making any inventive effort fall within the scope that the invention seeks to protect.

Figure 1:
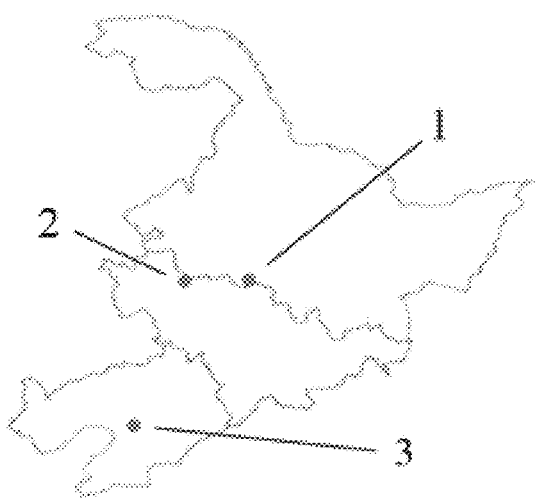
FIG. 1 is a map of a localized geographic region and distribution of agrometeorological station sites according to a specific embodiment of the invention.

The effect of large-scale phenology extraction is affected by factors such as the geographical environment of the localized geographic region and the growth characteristics of the research crop. A localized geographic region provided in this embodiment is the northeastern region of China, and the research crop is spring maize. Four key phenological periods of the three-leaf period, heading period, silking period, and maturity period of spring maize in Northeast China are extracted by using a shape model fitting method in this embodiment. In a map of a localized geographic region and distribution of agrometeorological station sites as shown in FIG. 1, three agrometeorological station sites are selected in the localized geographic region, namely 1-Shuangcheng, 2-Lishu, and 3-Haicheng.

Figure 2:
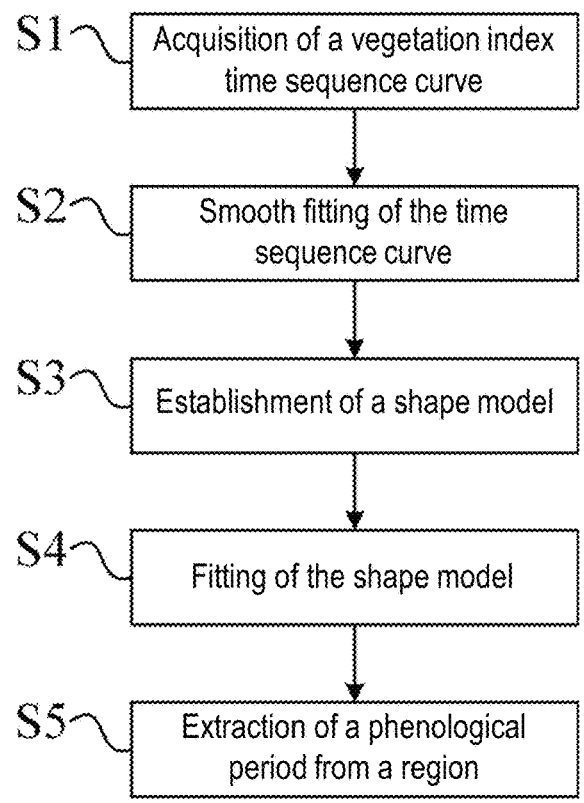
FIG. 2 is a schematic chart of a large-scale crop phenology extraction method based on a shape model fitting method according to a specific embodiment of the invention.

As shown in FIG. 2, the embodiments of the invention and the implementation process thereof include the following step.

In step S1, a vegetation index time sequence curve is obtained. According to crop surface classification data, MODIS satellite remote sensing data corresponding to pixels of a planted crop of spring maize in Northeast China is obtained, and a vegetation index of each pixel is calculated to obtain the corresponding vegetation index time sequence curve. According to geographic attribute data of the three agrometeorological stations, the MODIS satellite remote sensing data and vegetation index time sequence curves of the corresponding pixels from 2003 to 2013 are obtained. The vegetation index used in this embodiment is the wide dynamic range vegetation index (WDRVI). The wide dynamic range vegetation index has high sensitivity in high biomass areas, and its calculation formula is shown in formula (1):

$$WDRVI = \frac{\alpha \cdot \rho_{NIR} - \rho_{RED}}{\alpha \cdot \rho_{NIR} + \rho_{RED}} \quad (1)$$

in the formula, $\rho_{NIR}$ is reflectance in a near-infrared band, $\rho_{RED}$ is reflectance in a red band, and $\alpha$ is a weighting coefficient, which is 0.2 in this embodiment.

Figure 3:
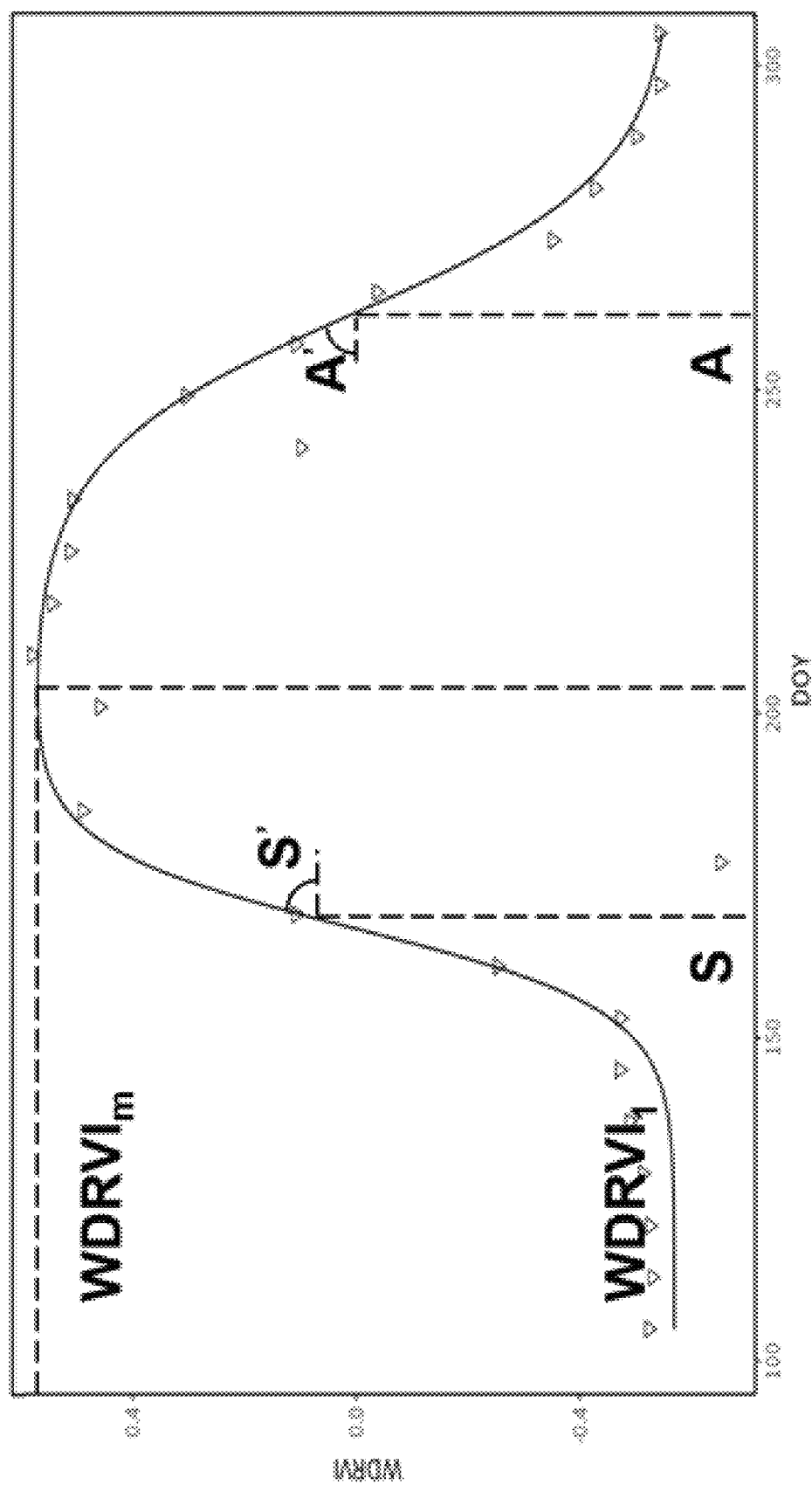
FIG. 3 is a schematic graph of smooth fitting of a double logistic function curve according to a specific embodiment of the invention.

In step S2, smooth fitting is performed on the time sequence curve. As shown in FIG. 3, the vegetation index time sequence curve of each pixel is smoothly fitted by using a double logistic function fitting means, the vegetation index curve of an entire growth period of the crop is fitted to a double logistic function by using an iterative nonlinear least squares method, and a smooth vegetation index time sequence curve is obtained. The double logistic function is expressed as formula (2):

$$VI(t) = \\ VI_1 + (VI_m - VI_1) \times \left( \frac{1}{1 + \exp(-S' \times (t - S))} + \frac{1}{1 + \exp(A' \times (t - A))} - 1 \right) \quad (2)$$

Figure 4:
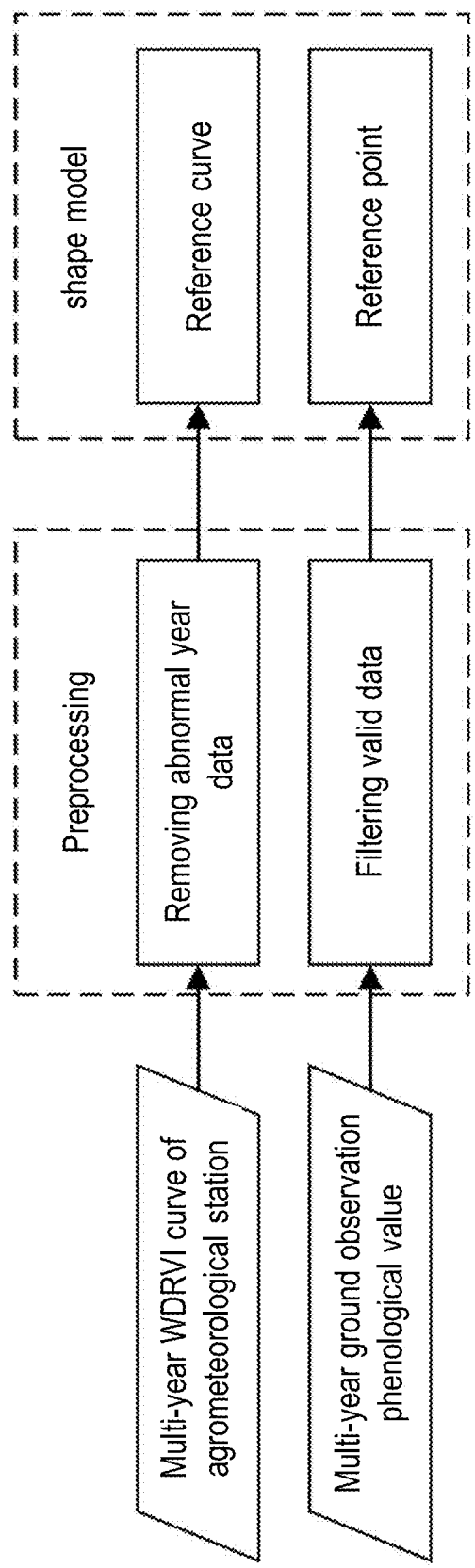
FIG. 4 is a schematic flow chart of establishment of a shape model according to a specific embodiment of the invention.
Figure 5:
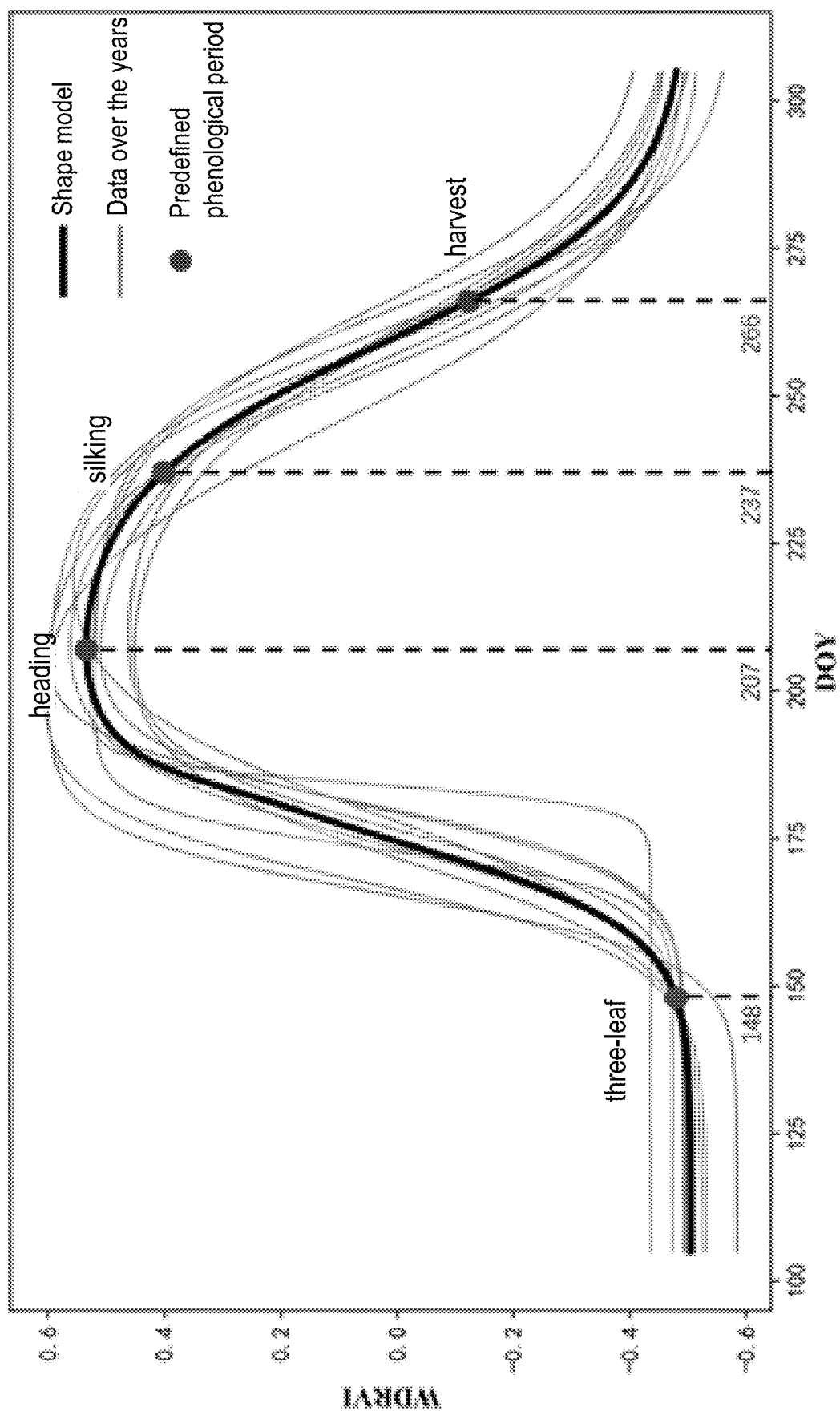
FIG. 5 is a schematic graph of the shape model according to a specific embodiment of the invention.

In the step S3, a shape model is established. In the schematic flow chart of establishment of a shape model as shown in FIG. 4, a shape model reference point uses a mean value of multi-year ground observation phenological periods of one agrometeorological station, and a shape model reference curve uses a mean value of multi-year historical vegetation index time sequence curves of the agrometeorological station after abnormal data is removed. The shape model corresponds with the agrometeorological station one-to-one. In this embodiment, three shape models are established for the three agrometeorological stations. FIG. 5 is a schematic graph of one shape model provided by this embodiment.

Figure 6:
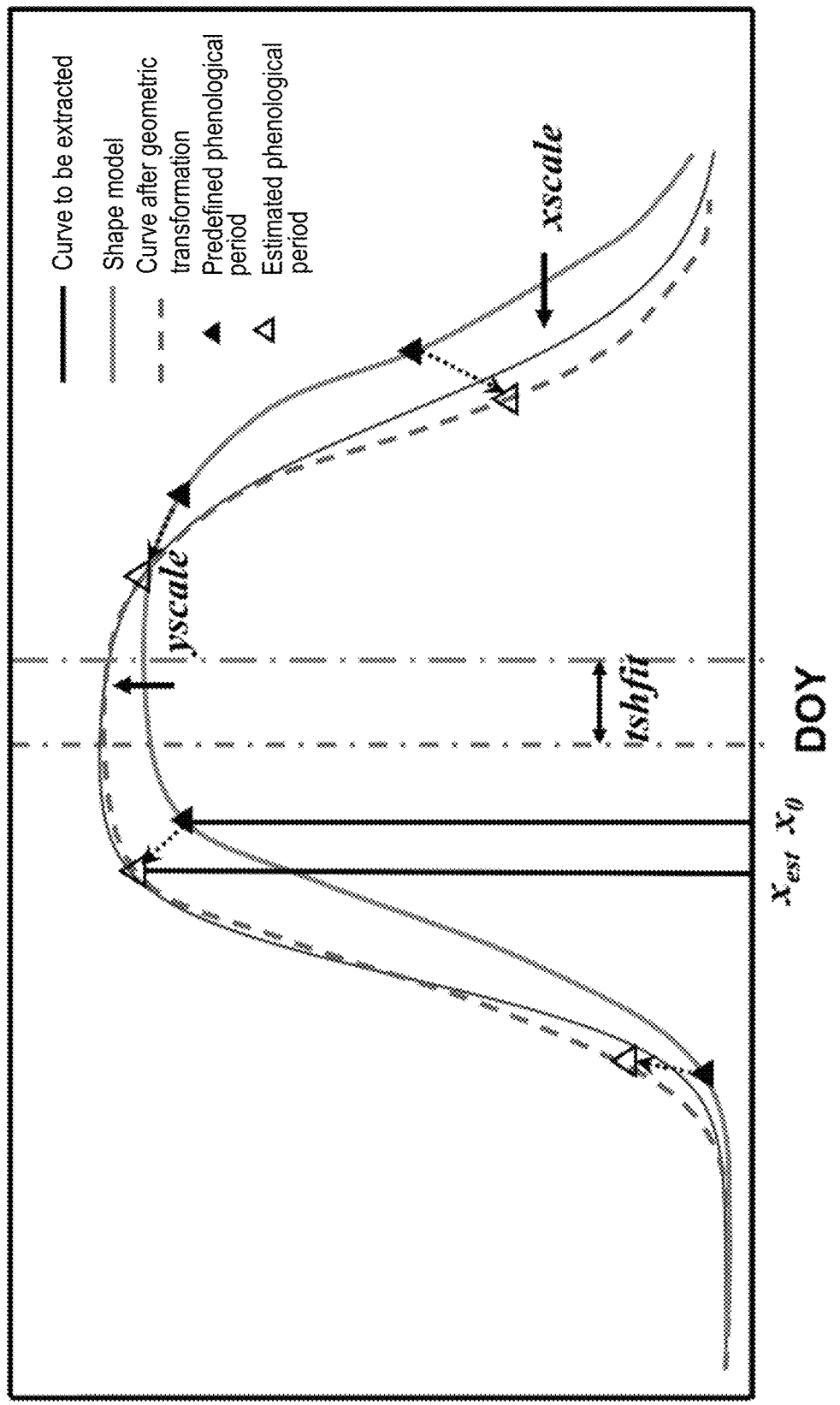
FIG. 6 is a schematic graph of a transformation process of the shape model according to a specific embodiment of the invention.

In step S4, shape model fitting method is performed. According to a spatial relationship of the three agrometeorological stations of the pixels in Northeast China, a most suitable shape model is selected for each pixel according to a minimum weighted geographic distance. In a schematic graph of a transformation process of the shape model as shown in FIG. 6, the shape model reference curve is fitted to the smooth vegetation index time sequence curve of the pixel, as shown in formula (3):

$$g(x) = yscale \times h(xscale \times (x_0 + tshift)) \quad (3)$$

A root mean square error (RMSE) between the two curves is calculated to be treated as a scaling parameter exhibiting an optimal fitting effect, and acting as an optimal scaling parameter for the pixel, the calculation of the minimum root mean square error is shown in formula (4):

$$RMSE = \sqrt{\frac{1}{73} \sum_{t=5,10,\ldots 365} (f(x) - g(x))^2} \quad (4)$$

The results of the optimal scaling parameters for different provinces calculated in this embodiment are as follows:

TABLE 1

Optimal scaling parameters for different provinces in the Northeast region (2003-2013)

| Province | xscale | | | yscale | | | tshift | | |
|---|---|---|---|---|---|---|---|---|---|
| | Mean | Max | Min | Mean | Max | Min | Mean | Max | Min |
| Heilongjiang | 1.01 | 1.17 | 0.9 | 1.01 | 1.17 | 0.9 | 1.01 | 1.17 | 0.9 |
| Jilin | 0.99 | 1.14 | 0.9 | 0.99 | 1.14 | 0.9 | 0.99 | 1.14 | 0.9 |
| Liaoning | 1.03 | 1.24 | 0.9 | 1.03 | 1.24 | 0.9 | 1.03 | 1.24 | 0.9 |

In step S5, a phenological period is extracted from the region. According to the optimal scaling parameter of each pixel, the shape model reference point is transformed to obtain the phenological period of each pixel to be extracted. The calculation formula of an extraction process of the phenological period is provided as follows:

$$X_{est} = xscale \times (x_0 + tshift) \quad (5)$$

The extraction precision RMSE of the four key phenological periods in this embodiment is 5.80 to 10.28 days. The extraction precision of most phenological dates (91.8%) of the studied pixels is within 15 days. Specific phenological extraction results are shown in the following table:

TABLE 2

Phenology extraction results of different provinces in Northeast China (2003-2013)

| Phenological period | Region | RMSE (days) |
|---|---|---|
| Three-leaf period | Heilongjiang | 5.90 |
| | Jilin | 5.80 |
| | Liaoning | 6.77 |
| | All | 6.17 |
| Heading period | Heilongjiang | 8.07 |
| | Jilin | 7.02 |
| | Liaoning | 8.46 |
| | All | 7.87 |
| Silking period | Heilongjiang | 10.49 |
| | Jilin | 7.29 |
| | Liaoning | 10.24 |
| | All | 9.45 |
| Maturity period | Heilongjiang | 12.85 |
| | Jilin | 10.25 |
| | Liaoning | 10.58 |
| | All | 11.28 |

According to the method of the present invention, macroscopic features of the vegetation index curve in the growth period are used, such that the influence of localized fluctuation and noise of the curve can be reduced, and precise extraction results are obtained. In addition, in the method, each phenological period of the crop may be extracted at the same time, and there is no need to respectively set different measurement standards, such that the method can be applied to large-scale crop phenology extraction.

What is claimed is:

1. A large-scale crop phenology extraction method based on a shape model fitting method, comprising:

step S1: obtaining a vegetation index time sequence curve, wherein all pixels where a crop whose phenology is to be extracted is located in a localized geographic region are selected according to crop surface classification data, a vegetation index of each of the pixels is calculated based on satellite remote sensing image data to obtain the vegetation index time sequence curve of each of the pixels, and a multi-year vegetation index time sequence curve of pixels where agrometeorological stations are located is obtained according to geographic coordinate data of the agrometeorological stations;

step S2: performing smooth fitting on the vegetation index time sequence curve, wherein the vegetation index time sequence curve of each of the pixels where the crop whose phenology is to be extracted is located and each of the pixels where the agrometeorological stations are located are smoothly fitted by using a dual logistic function fitting means, and a smooth vegetation index time sequence curve is obtained;

step S3: establishing shape models, wherein a shape model reference point is established by using a ground phenological observation value recorded by the agrometeorological stations, a shape model reference curve, which is corresponded, is established by using the vegetation index time sequence curve of each of the pixels where the agrometeorological stations are located, the shape models is formed by using the shape model reference point and the shape model reference curve, one of the shape models is established for each of the agrometeorological stations, and a plurality of the shape models are established for a plurality of station sites;

step S4: performing a shape model fitting, wherein a most suitable shape model corresponding to each of the pixels where the crop whose phenology is to be extracted is located is selected according to a spatial relationship between each of the pixels and the agrometeorological stations in the localized geographic region, the shape model reference curve is fitted to the smooth vegetation index time sequence curve of the pixels, a root mean square error (RMSE) between two curves, which are fitted, is calculated, and a scaling parameter corresponding to a minimum root mean square error is treated as an optimal scaling parameter of the pixels; and step S5: extracting phenological periods from a region, wherein the shape model reference point is transformed according to the optimal scaling parameter to obtain a phenology extraction result of each of the pixels where the crop whose phenology is to be extracted is located;

wherein the dual logistic function fitting means in the step S2 specifically comprises: fitting the vegetation index time sequence curve of an entire growth period of the crop to a double logistic function curve, wherein a fitted formula is expressed as follows:

$$VI(t) = VI_1 + (VI_m - VI_1) \times \left( \frac{1}{1+\exp(-S' \times (t-S))} + \frac{1}{1+\exp(A' \times (t-A))} - 1 \right)$$

where $VI_l$ represents a mean vegetation index in a crop non-growing period (i.e., a first half) in the vegetation index time sequence curve, $VI_m$ represents a peak value of the vegetation index time sequence curve, t represents time, S and A respectively represent time corresponding to a rising inflection point and a falling inflection point in the vegetation index time sequence curve, S' and A' respectively represent curvatures at the rising inflection point and the falling inflection point, and VI(t) represents the vegetation index at time t.

2. The large-scale crop phenology extraction method based on the shape model fitting method according to claim 1, wherein a wide dynamic range vegetation index (WDRVI) is calculated as follows:

$$WDRVI = \frac{\alpha \cdot \rho_{NIR} - \rho_{RED}}{\alpha \cdot \rho_{NIR} + \rho_{RED}}$$

in the formula, $\rho_{NIR}$ is a reflectance in a near-infrared band, $\rho_{RED}$ is a reflectance in a red band, and $\alpha$ is a weighting coefficient, whose value varies according to different crops, generally is 0.1 to 0.2.

3. The large-scale crop phenology extraction method based on the shape model fitting method according to claim 1, wherein in the step S3, the shape model reference point uses a mean value of multi-year ground observation phenological periods of the agrometeorological stations, and the shape model reference curve uses a mean value of multi-year historical vegetation index time sequence curves of each of the pixels where the agrometeorological stations are located.

4. The large-scale crop phenology extraction method based on the shape model fitting method according to claim 1, wherein in the step S4, a selection of the most suitable shape model for each of the pixels where the crop whose phenology is to be extracted is located according to the spatial relationship between the pixels and the agrometeorological stations are comprehensively made based on a spatial distance and a geographical environment factor and is processed and obtained by weighted calculation.

5. The large-scale crop phenology extraction method based on the shape model fitting method according to claim 1, wherein in the shape model fitting performed in the step S4, the following formula is used to fit and transform the shape model reference curve to the smooth vegetation index time sequence curve of the crop whose phenology is to be extracted, and a specific formula is as follows:

$$g(x) = yscale \times h(xscale \times (x_0 + tshift))$$

where g(x) represents the shape model reference curve after fitting and transformation, h(x) represents the shape model reference curve, xscale and yscale respectively represent the scaling parameter in x-axis and y-axis directions, tshift represents an offset in the x-axis direction, and $x_0$ represents the shape model reference point, and the following formula is then used to process and obtain the root mean square error (RMSE) between the two curves of the shape model reference curve after fitting and transformation and the smooth vegetation index time sequence curve of the crop whose phenology is to be extracted:

$$RMSE = \sqrt{\frac{1}{365/n} \sum_{t=n,2n,\ldots 365} (f(x) - g(x))^2}$$

where x represents a daily date, n represents a time interval of a curve, and f(x) represents the smooth vegetation index time sequence curve of the crop whose phenology is to be extracted.

6. The large-scale crop phenology extraction method based on the shape model fitting method according to claim 1, wherein in the step S5, the following formula is used to transform the shape model reference point according to the optimal scaling parameter to obtain the phenological periods to be extracted of each of the pixels where the crop whose phenology is to be extracted is located, and extracted values of the phenological periods of all of the pixels in the localized geographic region are integrated to obtain a phenological distribution in time and space of the region:

$$X_{est} = xscale \times (x_0 + tshift)$$

where $x_0$ represents a phenological period of the shape model reference point, and $X_{est}$ is an extracted and obtained phenological period of the crop whose phenology is to be extracted.

7. The large-scale crop phenology extraction method based on the shape model fitting method according to claim 1, wherein a size of the localized geographic region is not limited and at least comprises one of the pixels.

8. The large-scale crop phenology extraction method based on the shape model fitting method according to claim 1, wherein the phenological periods to be extracted comprises each of phenological periods of an entire growth period of the crop.

9. The large-scale crop phenology extraction method based on the shape model fitting method according to claim 1, wherein the pixels are a smallest pixel unit in the satellite remote sensing image data.

* * * * *